United States Patent
Vankerkhove et al.

(10) Patent No.: US 8,893,348 B2
(45) Date of Patent: Nov. 25, 2014

(54) WIPER BLADE FOR A WINDOW WIPER AND METHOD FOR THE PRODUCTION OF SAID WIPER BLADE

(75) Inventors: Bart Vankerkhove, Leuven (BE); Reiner Lay, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 453 days.

(21) Appl. No.: 13/202,118

(22) PCT Filed: Feb. 18, 2010

(86) PCT No.: PCT/EP2010/052055
§ 371 (c)(1),
(2), (4) Date: Oct. 31, 2011

(87) PCT Pub. No.: WO2010/094742
PCT Pub. Date: Aug. 26, 2010

(65) Prior Publication Data
US 2012/0036672 A1 Feb. 16, 2012

(30) Foreign Application Priority Data
Feb. 20, 2009 (DE) .......................... 10 2009 001 043

(51) Int. Cl.
*B60S 1/38* (2006.01)
(52) U.S. Cl.
CPC ............ *B60S 1/38* (2013.01); *B60S 2001/3898* (2013.01); *B60S 2001/3829* (2013.01); *B60S 2001/3836* (2013.01)
USPC ...................... 15/250.48; 264/145; 264/271.1
(58) Field of Classification Search
CPC ............... B60S 1/38; B60S 2001/3827; B60S 2001/3829; B60S 2001/3898
USPC .................. 15/250.361, 250.48, 250.06, 245, 15/245.1; 29/428; 264/145, 271.1
See application file for complete search history.

(56) References Cited

U.S. PATENT DOCUMENTS 2,179,454 A * 11/1939 Paulus .......................... 15/250.4
2,186,193 A * 1/1940 Christen ...................... 15/250.4
(Continued)

FOREIGN PATENT DOCUMENTS

CA         2022047 A1   5/1991
DE    10200603523 A1   1/2008
(Continued)

OTHER PUBLICATIONS

PCT/EP2010/052055 International Search Report.

*Primary Examiner* — Gary Graham
(74) *Attorney, Agent, or Firm* — Michael Best & Friedrich LLP

(57) ABSTRACT

The invention relates to a wiper blade for a window wiper, in particular a window wiper for a motor vehicle, comprising a wiper rubber (1) made from an elastomer material with a base section (3) and a lip section (5), wherein the elastomer material at least partially surrounds a fabric insert (13). The base section (3) and the lip section (5) are connected to each other by the fabric insert (13), wherein the fabric insert (13) serves as a joint (7), and/or a part (17) of the fabric insert (13) protrudes out of the base section (3) on the side facing away from the lip section (5). Furthermore, the invention relates to a method for producing a wiper blade, in which a fabric strip is guided through an extruder die in order to form a fabric insert (13), the fabric strip is surrounded by an elastomer material in order to produce an extruded profile, and the extruded profile is cut into individual wiper rubbers (1).

20 Claims, 4 Drawing Sheets

(56) References Cited

U.S. PATENT DOCUMENTS

| | | | |
|---|---|---|---|
| 2,908,028 A * | 10/1959 | Runton et al. | 15/250.48 |
| 3,116,509 A * | 1/1964 | Contant et al. | 15/250.48 |
| 3,121,133 A * | 2/1964 | Mathues | 264/241 |
| 3,718,940 A * | 3/1973 | Bode | 15/250.06 |
| 4,103,385 A * | 8/1978 | Porter | 15/250.48 |
| 4,669,144 A | 6/1987 | Yasukawa et al. | |
| 5,459,900 A | 10/1995 | Mege et al. | |
| 5,568,670 A | 10/1996 | Samples et al. | |
| 6,004,659 A | 12/1999 | Leutsch et al. | |
| 6,216,311 B1 | 4/2001 | Van Damme et al. | |
| 6,401,292 B1 * | 6/2002 | Leutsch | 15/250.48 |

FOREIGN PATENT DOCUMENTS

| | | | |
|---|---|---|---|
| EP | 0665143 A1 | | 8/1995 |
| FR | 2804392 A1 | | 8/2001 |
| GB | 451136 | * | 7/1936 |
| JP | 57077241 A | | 5/1982 |
| WO | 00/20265 A1 | | 4/2000 |

* cited by examiner

WIPER BLADE FOR A WINDOW WIPER AND METHOD FOR THE PRODUCTION OF SAID WIPER BLADE

BACKGROUND OF THE INVENTION

The invention is based on a wiper blade for a window wiper, in particular a window wiper for a motor vehicle. The invention also relates to a method for producing such a wiper blade.

Wiper blades for window wipers are usually produced from elastomer materials. The use of elastomer materials on the one hand allows the wiper blades to adapt themselves to the contour of a windshield of a motor vehicle and on the other hand means that adequate elasticity is ensured under differing thermal requirements. In order that the window wiper leads to good wiping results in both directions of movement, a wiping rubber is usually produced from a base portion and a lip portion, wherein the base portion and the lip portion are connected to each other in such a way that the lip portion can flip over in accordance with the wiping direction of the window wiper. Usually, the base portion, the lip portion and the joint between the base portion and the lip portion are produced from the elastomer material as one part, for example by an extrusion process. In order to ensure sufficiently stable attachment of the lip portion and the base portion, however, a minimum thickness of the elastomer material in the joint region is required. This may, however, lead to a restriction of the swiveling movement. Moreover, the elastomer material in the joint region is subjected to additional loading by the regular flipping over, which can lead to a weakening of the material.

In order to strengthen the base portion and the joint region, it is known, for example from WO-A 00/20265, to produce the elastomer material of the base portion and of the joint portion from a fiber-reinforced elastomer material. Only the lip portion is not reinforced by fibers, in order that the wiping quality is not impaired. However, such fiber reinforcement has the disadvantage that the articulating properties of the joint portion are impaired, since the material as a whole is stiffened by the fiber component.

In order to avoid the lip portion of a wiper blade being permanently deformed, it is known from JP 57077241 to insert a fabric portion along the central axis of the wiping rubber. The fabric strip has a higher tensile strength that the elastomer material and shows outstanding resistance to deformations, so that, even when the wiper blade is not actuated for a long time, permanent deformation of the wiping lip is avoided. A disadvantage, however, is that the positioning of the fabric portion such as that disclosed in JP 57077241 is extremely difficult.

SUMMARY OF THE INVENTION

A wiper blade formed according to the invention for a window wiper, in particular a window wiper for a motor vehicle, comprises a wiping rubber of elastomer material with a base portion and a lip portion, wherein the elastomer material at least partially encloses a fabric insert. The base portion and the lip portion are connected to each other by the fabric insert, wherein the fabric insert serves as a joint and/or part of the fabric insert protrudes from the base portion on the side facing away from the lip portion.

The fact that the base portion and the lip portion are connected to each other by the fabric insert, whereby the fabric insert serves as a joint, means that improved flipping-over characteristics of the lip portion with respect to the base portion are achieved than is the case when using elastomer material. Moreover, it avoids the joint being a potential weak point, since the fabric insert is stable, in particular with respect to weathering influences and crack formation caused by weathering influences. The fabric insert can also be made to a smaller thickness than a joint portion of elastomer material, whereby the flipping-over characteristics are likewise improved.

The protrusion of part of the fabric insert from the base portion on the side facing away from the lip portion has the advantage that the protruding part of the fabric insert can serve, for example, as a means for transporting the wiper profile during or after the extrusion. The wiping rubber is usually produced by extrusion of the elastomer material. After the extrusion, the elastomer material is vulcanized to form the wiping rubber. The thermal treatment required for the vulcanization may be carried out, for example, by the extruded profile that is produced during the extrusion being attached to the protruding part of the fabric material. In this way, the elastomer material is freely accessible from all sides, since the extruded profile is not lying against anything anywhere. Improved thermal treatment is possible in this way. Also in the case of vulcanization in a salt bath, the elastomer material is accessible from all sides if the extruded profile produced during the extrusion is attached to the protruding part of the fabric insert and transported.

The part of the fabric insert protruding from the base portion can also be used for attaching the extruded profile thereby to a transporting device for method steps that are carried out before the vulcanization or follow on after the vulcanization.

In order to ensure adequate elasticity under differing temperature requirements, the wiping rubber is produced from an elastomer material. Suitable, for example, as elastomer materials for producing the wiping rubber are natural rubber (NR), chloroprene rubber (CR), butadiene rubber (BR), styrene-butadiene rubber (SBR), ethylene-propylene copolymers (EPM), ethylene-propylene-diene terpolymers (EPDM), ethylene-vinyl acetate copolymers (EVM), chlorinated polyethylene (CM), chlorosulfonated polyethylene (CSM), acrylonitrile-butadiene rubber (NBR), hydrogenated acrylonitrile-butadiene rubber (HNBR), fluororubber (FPM), polyurethane elastomer (PUR), mixtures of acrylonitrile-butadiene rubber and polyvinylchloride (NBR/PVC), as well as mixtures of these materials.

Particularly preferred is the elastomer material selected from the group comprising ethylene-propylene-diene terpolymers, natural rubber, chloroprene rubber or a mixture thereof.

A suitable method for producing a wiper blade comprises the following steps:
a) guiding a fabric strip through a die of an extruder to form a fabric insert,
b) enclosing the fabric strip in an elastomer material to produce an extruded profile,
c) cutting the extruded profile into individual wiping rubbers.

Suitable dies through which a fabric insert can be guided to form a fabric insert and in which the fabric insert is enclosed in an elastomer material to form an extruded profile are known to a person skilled in the art.

In order to guide the fabric strip through the die, it is necessary to provide a take-off device downstream of the die. The take-off device may either enclose the extruded profile or alternatively, in particular in the embodiment in which part of the fabric insert protrudes from the base portion on the side facing away from the lip portion, act on the part of the fabric insert that is protruding from the base portion. The take-off device preferably acts on the part of the fabric insert that is protruding from the base portion, since this avoids the extruded profile of the elastomer material being deformed by the take-off device.

After it leaves the extruded die, it is necessary to vulcanize the extruded profile. The vulcanizing generally takes place before the cutting of the extruded profile into individual wiping rubbers. As already described above, it is advantageous in particular if part of the fabric insert protrudes from the base portion on the side facing away from the lip portion, since the extruded profile can then be gripped at this protruding part and so the elastomer material is accessible from all sides for the vulcanization and no parts thereof are lying against anything.

To allow better gripping of the part of the fabric insert that is protruding from the base portion, it is advantageous if the part of the fabric insert that is protruding from the base portion has a thickening. The thickening may be formed, for example, by rolling up the material of the fabric insert. It is also possible, for example, to apply filaments or fabric strips to the fabric insert to produce the thickening. Alternatively, however, the thickening may also be produced from a different material. It is thus possible, for example, to enclose a filament that is produced from one or more fibers, or else for example a wire, in the material of the fabric insert. It is also possible, for example, to produce the thickening by applying a polymer material to the fabric insert. Any desired thermoplastic, elastomeric or thermosetting polymer material may be used here as the polymer material. When selecting the material, however, it must be ensured that it is stable, for example, with respect to temperatures of subsequent processing steps.

The thickening may be formed at any desired position of the part of the fabric insert that is protruding from the base portion. It is preferred, however, that the thickening is formed at the end of the part of the fabric insert that is protruding from the base portion.

In a further embodiment, the part of the fabric insert that is protruding from the base portion forms a sleeve. In the sleeve there may be fitted, for example, any desired component, for example a spring element. Used, for example, as the spring element that is fitted in the sleeve is a leaf spring, as is usually fitted in wiping rubbers for window wipers. The necessary bending of the wiping rubber is achieved by the use of the leaf spring. To produce the sleeve, an eyelet may be produced from the material of the fabric insert. In order to obtain a predetermined shape, it is possible additionally to strengthen the eyelet made from the material of the fabric insert. For this purpose it is possible, for example, to impregnate the fabric insert in a matrix material, for example a thermosetting resin. Alternatively, it is also possible, for example, to strengthen the eyelet for forming the sleeve by winding a further material around it, for example a metallic or polymeric material. A wire may be used, for example, for the winding.

Any desired material that can be processed into fibers may be used as the material for the fabric insert. However, the material must be stable with respect to the temperatures occurring in the production of the wiper blade.

Suitable materials for producing the fabric insert are, for example, natural fibers, mineral fibers or polymer fibers. It is preferred in particular if the fabric insert contains aramid fibers. It is most particularly preferred if the fabric insert consists of aramid fibers. Apart from aramid fibers, however, also suitable in particular for producing the fabric insert are polyamide, for example PA6, PA66 or PA12, polyester such as PET or PBT, polyacrylic, for example PAN, or cellulose acetate.

In particular if the fabric insert serves as a joint, it is possible to produce the lip portion and the base portion from different materials. In this way it is possible to adapt the chosen material for the lip portion and for the base portion to the respective requirements. Thus, for example, a harder material may be chosen for the base portion, in order to make more stable securing of the wiper blade possible, and a softer material may be chosen for the lip portion, in order to achieve a better wiping result.

In order to avoid the wiper blade juddering on a window to be wiped during operation, it is also possible to provide the lip portion or at least the wiping edge of the lip portion with a coating which, for example, contains dry lubricant particles. The choice of a suitable coating thus also allows a smear-free wiping result to be achieved and the wearing of the wiping rubber to be minimized.

BRIEF DESCRIPTION OF THE DRAWINGS

Embodiments of the invention are represented in the drawings and are explained in more detail in the description which follows.

In the drawing.

DETAILED DESCRIPTION

Figure 1:
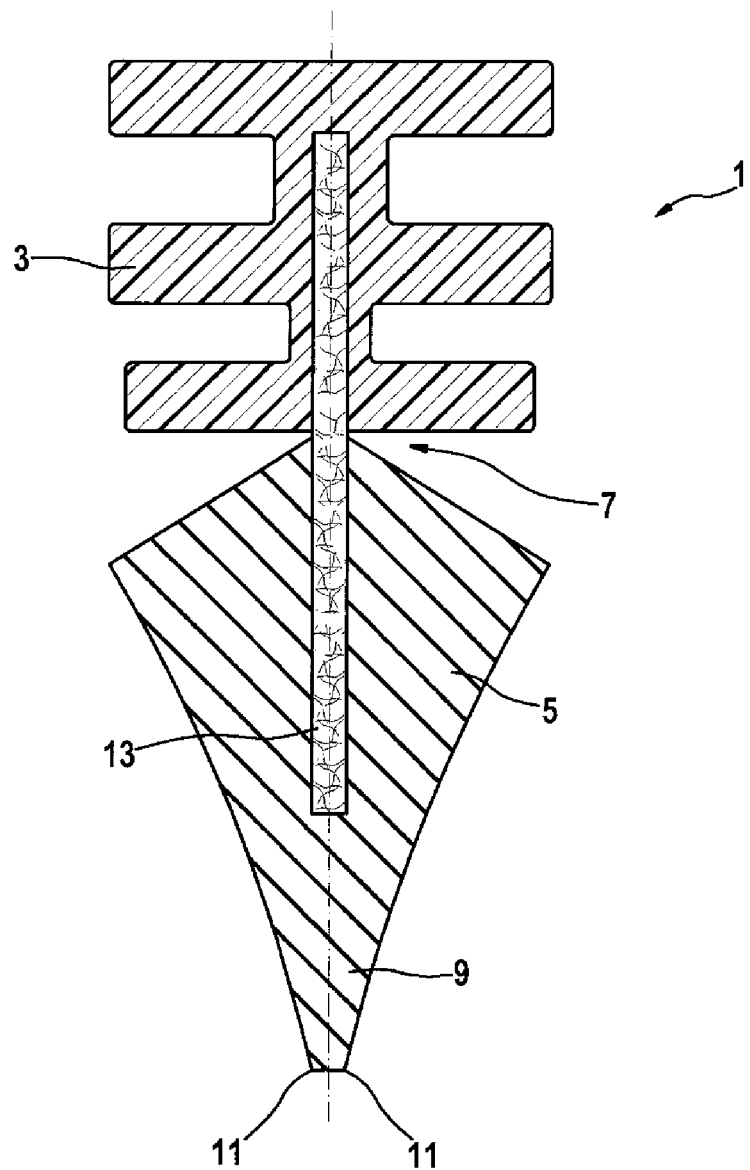
FIG. 1 shows a section through a wiping rubber formed according to the invention with a fabric insert, which serves as a joint.

Represented in FIG. 1 is a section through a wiper blade with a fabric insert serving as a joint.

A wiping rubber 1 formed according to the invention comprises a base portion 3 and a lip portion 5. The base portion 3 and the lip portion 5 are connected to each other by way of a joint portion 7.

In the case of a window wiper for a motor vehicle, the lip portion 5 of the wiping rubber 1 has a wiping lip 9 with two opposing wiping edges 11. With the wiping edge 11, the wiping lip 9 sweeps over a window to be cleaned and in this way removes water, for example, from the window. Since, in the case of a window wiper, a positive wiping result must be achieved in both directions of movement of the wiping rubber 1, two wiping edges 11 are necessary. The lip portion 5 in each case flips over here in the region of the joint portion 7, so that the wiping rubber 1 in each case sweeps over the window with one of the wiping edges 11.

In the embodiment represented here, the lip portion 5 and the base portion 3 enclose a fabric insert 13. The fabric insert 13 also forms the joint portion 7. Here it is not only possible, as represented in FIG. 1, for the lip portion 5 and the base portion 3 to touch, but also possible for part of the fabric portion between the base portion 3 and the lip portion 5 not to be covered by elastomer material.

The base portion 3 and the lip portion 5 may be produced in one extrusion process or two separate extrusion processes. It is preferred, however, that the base portion 3 and the lip portion 5 are extruded onto the fabric insert 13 in one extrusion process. Here, the base portion 3 and the lip portion 5 may be produced from the same elastomer material or from different elastomer materials.

Thus, for example, ethylene-propylene terpolymer, natural rubber, chloroprene rubber, butadiene rubber, styrene-butadiene rubber, acrylonitrile-butadiene rubber, polyurethane elastomers, NBR/PVC or blends thereof are suitable as elastomer materials for the base portion 3. It is particularly preferred for ethylene-propylene-diene terpolymer to be used for the base portion.

Elastomer materials with a low friction coefficient and a high wear resistance are preferably used as the material for the lip portion 5. In order to obtain sufficient flexibility of the lip portion, it is likewise preferred that the material with the low friction coefficient and the high wear resistance is an elastomer material. Suitable elastomer materials for the lip portion 5 are, for example, natural rubber, chloroprene rubber, butadiene rubber, styrene-butadiene rubber, ethylene-propylene copolymers, ethylene-propylene-diene terpolymers, ethylene-vinyl acetate copolymers, chlorinated polyethylene, chlorosulfonated polyethylene, acrylonitrile-butadiene rubber, hydrogenated acrylonitrile-butadiene rubber, fluororubber, polyurethane elastomers, mixtures of acrylonitrile-butadiene rubber and polyvinylchloride, as well as mixtures of these materials. Particularly preferred as the material for the lip portion is natural rubber.

In addition, to improve the wear resistance and to reduce the frictional resistance, it is also possible to apply a coating to the lip portion 5, in particular to the wiping lip 9 of the lip portion 5. Suitable coatings are, in particular, those which contain, for example, solid particles as anti-friction additives. Such solid particles are, for example, particles of polytetrafluoroethylene or graphite particles. Suitable coatings that contain corresponding anti-friction additives are known to a person skilled in the art.

In order to meet the specific requirements imposed on the base portion 3, for example the ageing resistance and the strength of the base portion, it is also possible for the elastomer material forming the base portion 3 to contain fillers, for example short fibers.

As already described above, suitable as the fabric material for the fabric insert 13 is any desired material from which it is possible to produce fibers that can be processed into a woven fabric. It is preferred, however, if the fabric insert 13 contains aramid fibers or consists of aramid fibers. Suitable aramid fibers are, for example, Kevlar®.

Figure 2:
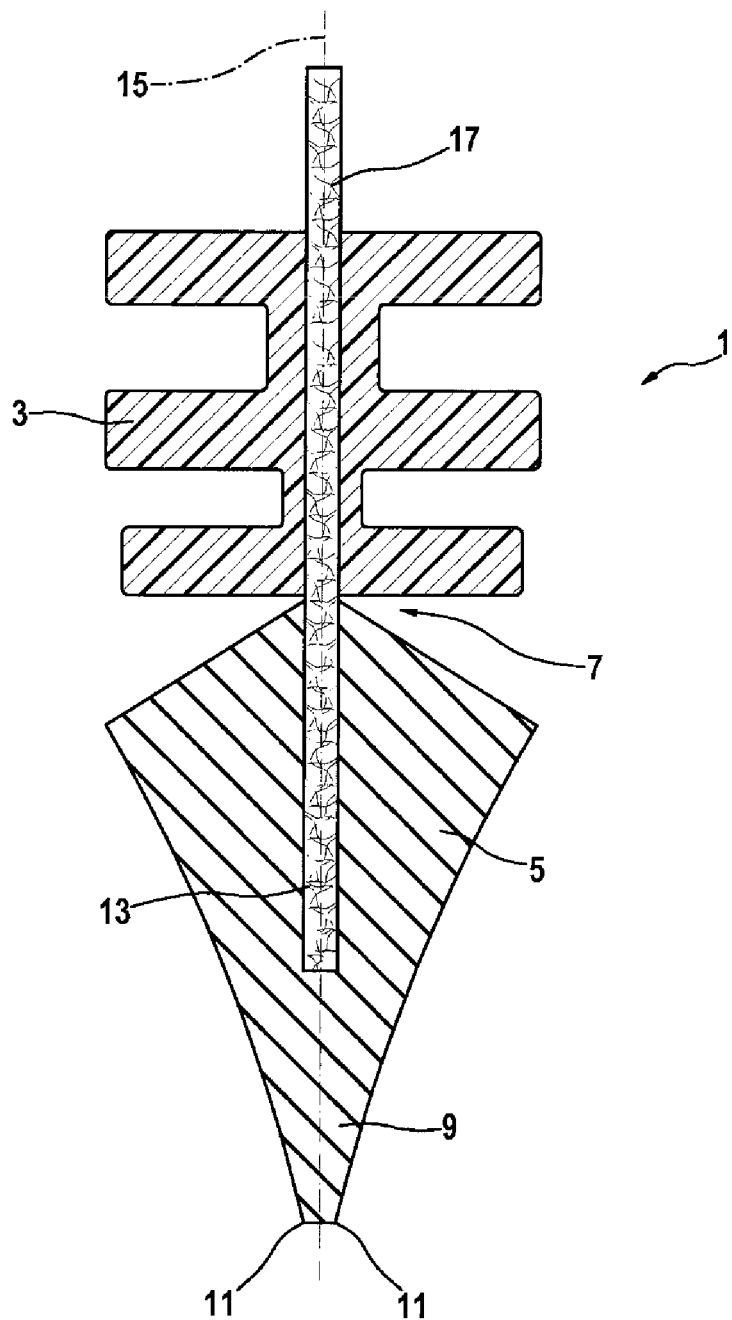
FIG. 2 shows a section through a wiping rubber formed according to the invention, in which part of the fabric insert protrudes from the base portion.

Represented in FIG. 2 is a wiping rubber with a fabric insert, wherein part of the fabric insert on the side facing away from the lip portion protrudes from the base portion.

As a difference from the embodiment represented in FIG. 1, in the embodiment represented in FIG. 2 the fabric insert 13 is formed such that it cuts completely through the base portion 3 along a center line 15, wherein part of the fabric insert 13 is enclosed by the lip portion 5 and part 17 of the fabric insert protrudes from the base portion 3 on the side opposite from the lip portion 5. In the embodiment represented here, the lip portion 5 and the base portion 3 are designed such that the joint portion 7 is formed by the fabric insert 13. Alternatively, however, it is also possible for the lip portion 5 and the base portion 3 to be produced as one part and for the joint portion 7 likewise to contain an elastomer material. Here it is possible on the one hand for the joint portion 7 to be produced completely from elastomer material, so that the fabric insert 13 is only contained in the base portion 3, or else for the joint portion to comprise the fabric insert 13, which is enclosed by elastomer material on both sides. It is preferred, however, that—as represented in FIG. 2—the fabric insert 13 alone forms the joint portion 7.

The protruding part 17 of the fabric insert 13 may be used, for example, to hang the finished extruded profile thereby and possibly transport it through subsequent working steps. Subsequent working steps may be, for example, the vulcanization of the elastomer material of the base portion 3 and the lip portion 5 or else possibly the coating of the wiping lip 9 of the lip portion 5. The cutting of the extruded profile forming the wiping rubber 1 is also such a subsequent working step.

Figure 3:
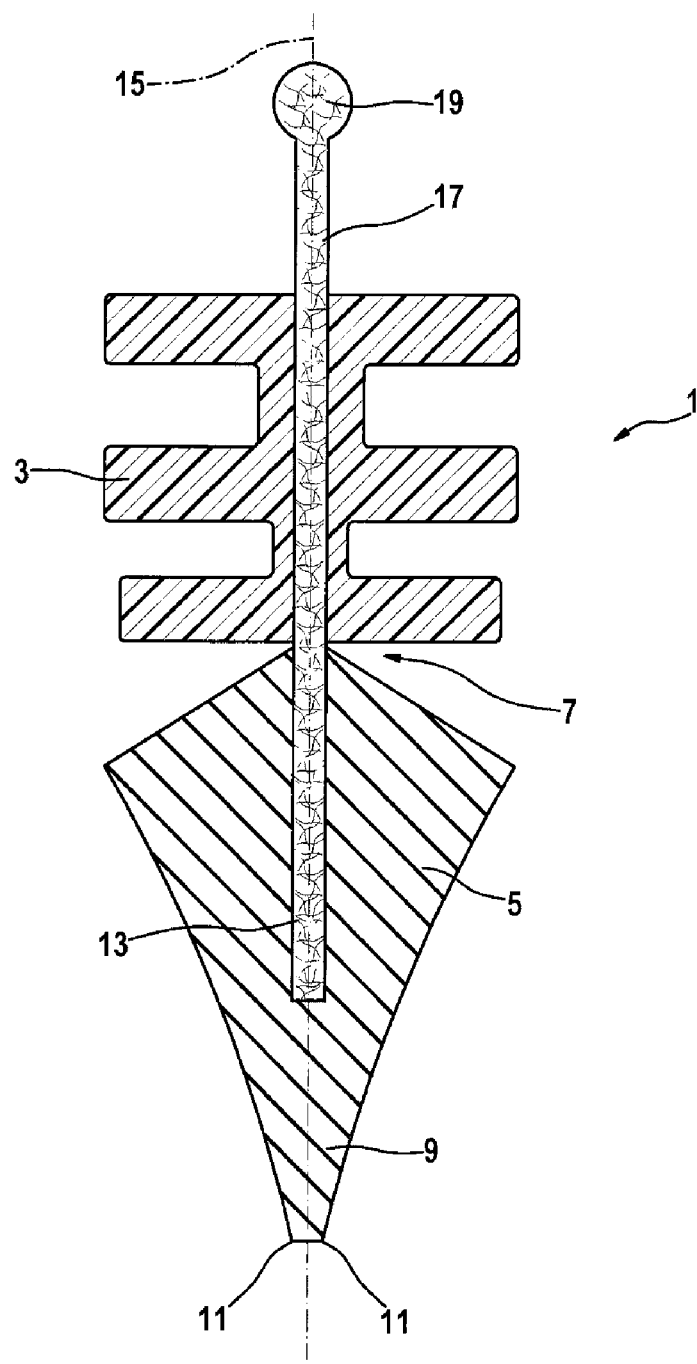
FIG. 3 shows a section through a wiping rubber formed according to the invention, with a thickening on the part of the fabric insert that is protruding from the base portion.

Represented in FIG. 3 is a further embodiment of a wiping rubber formed according to the invention.

The wiping rubber 1 represented in FIG. 3 differs from the wiping rubber represented in FIG. 2 in that the protruding part 17 of the fabric insert 13 has a thickening 19. Any desired method known to a person skilled in the art that is suitable for producing such a thickening may be used to produce the thickening 19. Suitable methods are, for example, suitable weaving techniques, processes for producing nonwovens or processes for textile finishing. Thus, the thickening 19 may be created, for example, by winding up the fabric insert. It is also possible, for example, to produce the thickening 19 by impregnating the fabric insert 13 with any desired resin. Furthermore, the thickening 19 may be produced, for example, by winding around a wire or by suitable weaving techniques. The application of further fabric inserts or fiber layers, for example by adhesive attachment or by bonding with a resin, is also possible. The thickening 19 may also be created, for example, by using thicker yarns for producing the woven fabric in the region of the thickening 19.

Figure 4:
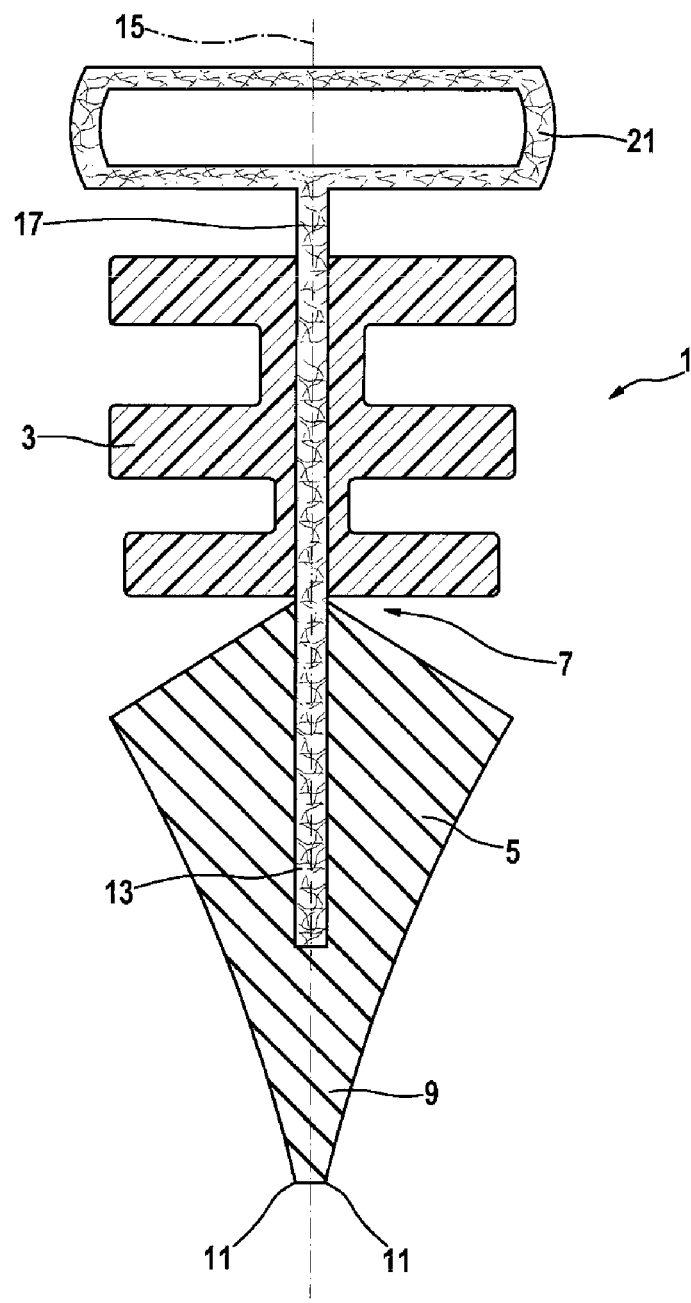
FIG. 4 shows a wiper blade formed according to the invention, with a sleeve on the part of the fabric insert that is protruding from the base portion.

A wiper blade formed according to the invention in a fourth embodiment is represented in FIG. 4.

The embodiment represented in FIG. 4 differs from the embodiment represented in FIG. 3 in that, instead of the thickening 19, a sleeve 21 is formed at the end of the protruding part 17 of the fabric insert 13. The sleeve 21 may, for example, be produced by forming an eyelet from the material of the fabric insert 13. In order to obtain a sleeve 21 with a stable shape, it is possible, for example, to impregnate the fabric insert 13 with any desired resin, preferably a thermosetting resin, for example a phenolic resin or an epoxy resin. Alternatively, however, it is also possible, for example, to insert an eyelet into the sleeve 21 in order to keep the sleeve 21 in its shape.

The sleeve 21 may be used, for example, for receiving a spring element, in particular a leaf spring. With such a spring element it is possible, for example, to create the necessary pretensioning for a wiping rubber such as that used as a window wiper in a motor vehicle.

Apart from the embodiment represented here, it is also possible, furthermore, for the protruding part 17 of the fabric insert 13 to have both a thickening 19 and a sleeve 21. Here it is both possible for the thickening 19 to be arranged between the base portion 3 and the sleeve 21, or else for the sleeve 21 to be arranged between the base portion 3 and the thickening 19.

Furthermore, apart from the embodiments represented in FIGS. 3 and 4, it is also possible for the joint portion 7 to be produced completely from elastomer material or else for the fabric insert 13 to be enclosed in elastomer material in the region of the joint portion 7. This is also possible in an embodiment that is not represented here, which has both a thickening 19 and a sleeve 21. It is preferred, however, as represented here, for the joint portion 7 to be formed only by the fabric insert 13 without any encapsulation in elastomer material. This is particularly advantageous whenever the base portion 3 and the lip portion 5 are produced from different materials.

What is claimed is:

1. A wiper blade for a window wiper, comprising a wiping rubber (1) of an elastomer material with a base portion (3) and a lip portion (5), wherein the elastomer material partially encloses a fabric insert (13), characterized in that the base portion (3) and the lip portion (5) are connected to each other by the fabric insert (13), wherein part (17) of the fabric insert (13) protrudes from the base portion (3) free from any material on a side of the base portion (3) facing away from the lip portion (5), wherein the lip portion (5) and the base portion (3) of the wiping rubber (1) are produced from different material.

2. The wiper blade as claimed in claim 1, characterized in that the part (17) of the fabric insert (13) that is protruding from the base portion (3) has a thickening (19).

3. The wiper blade as claimed in claim 2, characterized in that the thickening (19) is formed at an end of the part (17) of the fabric insert (13) that is protruding from the base portion (3).

4. The wiper blade as claimed in claim 1, characterized in that the part (17) of the fabric insert (13) that is protruding from the base portion (13) forms a sleeve (21) in which a spring element can be fitted.

5. The wiper blade as claimed in claim 1, characterized in that the fabric insert (13) contains aramid fibers.

6. A method for producing a wiper blade as claimed in claim 1, comprising the following steps:
(a) guiding a fabric strip through a die of an extruder to form a fabric insert (13),
(b) enclosing the fabric strip in an elastomer material to produce an extruded profile,
(c) cutting the extruded profile into individual wiping rubbers (1).

7. The method as claimed in claim 6, characterized in that the extruded profile is vulcanized before the cutting in step (c).

8. The method as claimed in claim 6, characterized in that the elastomer material is selected from the group comprising natural rubber, chloroprene rubber, ethylene-propylene-diene terpolymers and mixtures of two or more thereof.

9. The wiper blade as claimed in claim 1, characterized in that the base portion (3) and the lip portion (5) are integral.

10. A wiper blade for a window wiper, comprising a wiping rubber (1) of an elastomer material with a base portion (3) and a lip portion (5), wherein the elastomer material partially encloses a fabric insert (13), characterized in that the base portion (3) and the lip portion (5) are connected to each other only by the fabric insert (13), wherein only the fabric insert (13) is a joint (7) between the base portion (3) and the lip portion (5), and wherein part (17) of the fabric insert (13) protrudes from the base portion (3) free from any material on a side of the base portion (3) facing away from the lip portion (5).

11. The wiper blade as claimed in claim 10, characterized in that the fabric insert (13) contains aramid fibres.

12. The wiper blade as claimed in claim 10, characterized in that the lip portion (5) and the base portion (3) of the wiping rubber (1) are produced from different material.

13. The wiper blade as claimed in claim 10, characterized in that the part (17) of the fabric insert (13) that is protruding from the base portion (3) has a thickening (19).

14. The wiper blade as claimed in claim 13, characterized in that the thickening (19) is formed at an end of the part (17) of the fabric insert (13) that is protruding from the base portion (3).

15. The wiper blade as claimed in claim 10, characterized in that the part (17) of the fabric insert (13) that is protruding from the base portion (13) forms a sleeve (21) in which a spring element can be fitted.

16. A method for producing a wiper blade as claimed in claim 10, comprising the following steps:
(a) guiding a fabric strip through a die of an extruder to form a fabric insert (13),
(b) enclosing the fabric strip in an elastomer material to produce an extruded profile,
(c) cutting the extruded profile into individual wiping rubbers (1).

17. The method as claimed in claim 16, characterized in that the extruded profile is vulcanized before the cutting in step (c).

18. The method as claimed in claim 16, characterized in that the elastomer material is selected from the group comprising natural rubber, chloroprene rubber, ethylene-propylene-diene terpolymers and mixtures of two or more thereof.

19. The wiper blade as claimed in claim 10, characterized in that the fabric insert (13) at the joint (7) is uncovered by the elastomer material.

20. A wiper blade for a window wiper, comprising a wiping rubber (1) of an elastomer material with a base portion (3) and a lip portion (5), wherein the elastomer material partially encloses a fabric insert (13), characterized in that the base portion (3) and the lip portion (5) are connected to each other by the fabric insert (13), wherein part (17) of the fabric insert (13) protrudes from the base portion (3) free from any material on a side of the base portion (3) facing away from the lip portion (5), wherein the part (17) of the fabric insert (13) that is protruding from the base portion (3) has a thickening (19).

* * * * *